May 18, 1965   H. NÄDLER ETAL   3,184,360
MACHINE FOR MAKING CARCASSES FOR PNEUMATIC TIRES
Filed Oct. 8, 1962   3 Sheets-Sheet 2

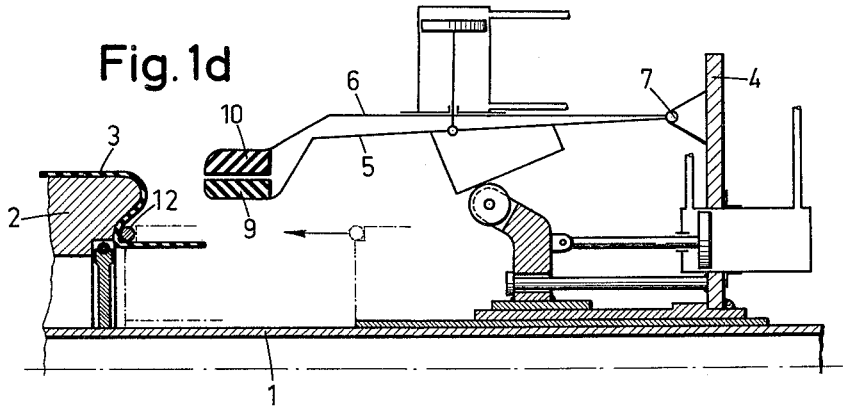
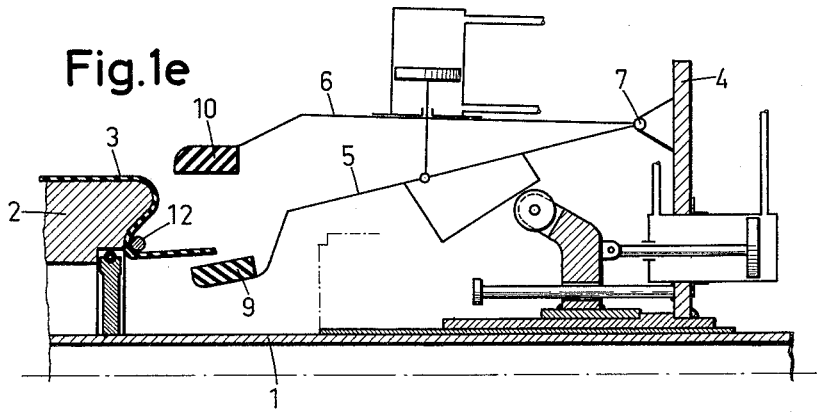

United States Patent Office 3,184,360
Patented May 18, 1965

3,184,360
MACHINE FOR MAKING CARCASSES FOR PNEUMATIC TIRES
Heinrich Nädler, Kreis Neustadt am Rubenberge, and Hans Menell, Ahlem, Hannover, Germany, assignors to Continental Gummi-Werke Aktiengesellschaft, Hannover, Germany
Filed Oct. 8, 1962, Ser. No. 228,932
Claims priority, application Germany, Oct. 10, 1961, C 25,246
8 Claims. (Cl. 156—401)

The present invention relates to a machine for making carcasses for pneumatic tires and comprises a drum for receiving the fabric layers forming the carcass and also comprises gripper members movable radially with regard to said drum. These gripper members comprise elastic clamping rings for grasping the rim portions of the fabric layers and setting the same under stress against the drum.

In connection with machinery of the general type referred to above, it is known to design those free ends of the grippers or levers carrying the same which face the drum in such a way that following the placing of the fabric upon the drum and the setting of the beads, said grippers grasp the laterally protruding marginal portions of the fabric and place the same around the beads in such a way that the carcass fabric layers will embrace the bead cores.

With a construction of this type, the free marginal portions cannot be placed so that they rest against the respective adjacent fabric portions along the entire surface and without folds. This is the case in particular when the fabric marginal portions are to be set within the range of the maximum drum diameter of high-shoulder drums. In this connection, it is particularly important to note that a setting movement of the fabric ends around the cores is possible only when the grippers or elastic bands can be guided in conformity with the irregular contour of the drum.

It is therefore an object of the present invention to provide a machine for producing carcasses for pneumatic vehicle tires with a drum for receiving the carcass forming layers and with grippers movable radially with regard to said drum, which will overcome the above-mentioned drawbacks.

It is another object of this invention to provide a machine as set forth in the preceding paragraph which will considerably simplify the control of said grippers while improving and facilitating the setting of the marginal portions of the carcass layers.

It is also an object of this invention to provide a machine as set forth in the preceding paragraphs which will make it possible to vary the setting pressure for the marginal portions of the carcass layers.

Figure 1:
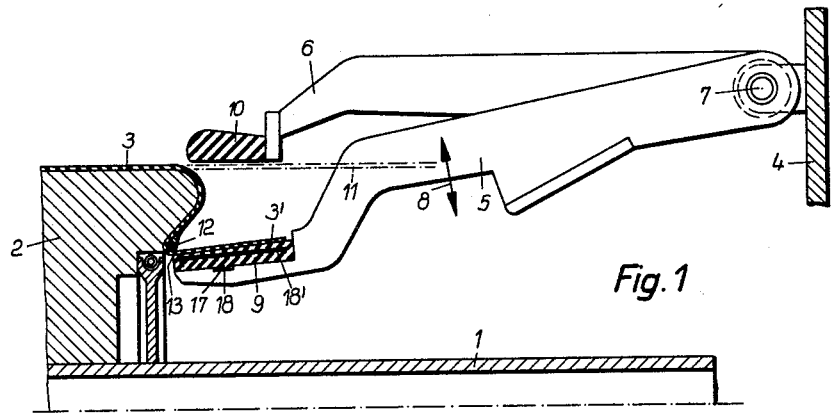
Figures 2, 3:
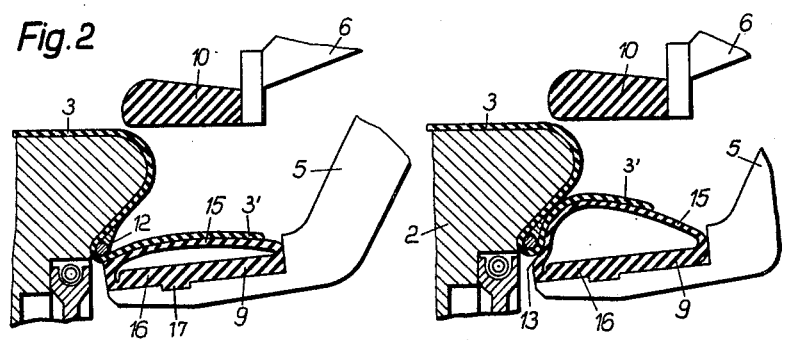
Figure 4:
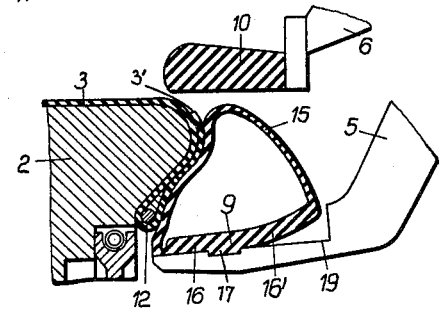
Figure 5:
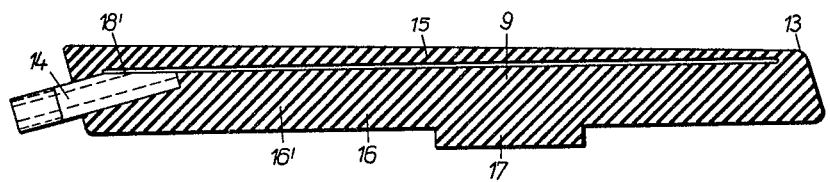
Figure 1A:
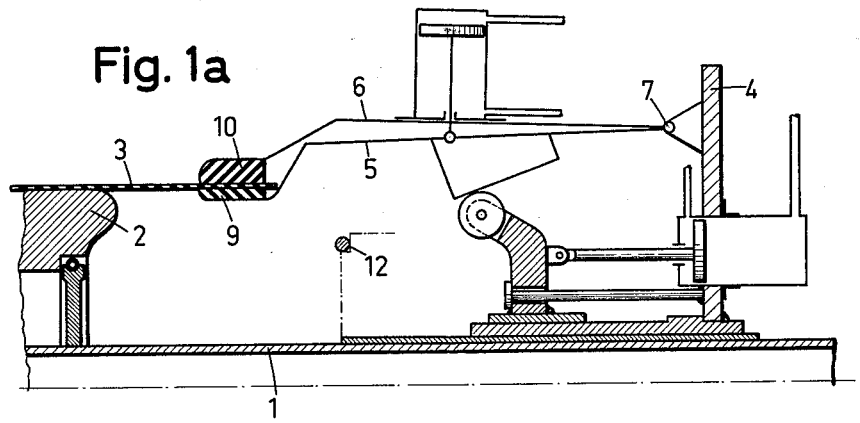
Figure 1B:
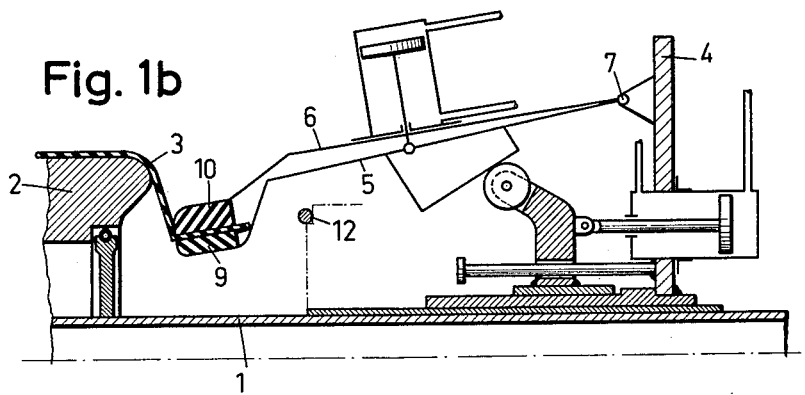
Figure 1C:
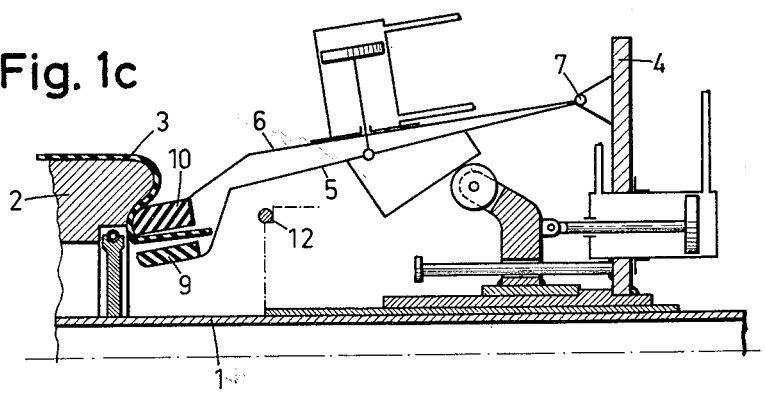

These and other objects and advantages of the invention will appear more clearly from the following specification in connection with the accompanying drawings, in which:

FIGURE 1 is a longitudinal section through a portion of a machine for making tire carcasses;

FIGURES 1a–e show the radial movement of the grippers 5, 6 and the axial movement of the drum 2 when in use;

FIGURES 2, 3 and 4 respectively illustrate partial sections through the machine according to FIG. 1 while illustrating three different phases of operation for forming a tire carcass in conformity with the present invention;

FIGURE 5 illustrates on an enlarged scale a section through an elastic band shown in FIG. 1 for use in connection with the present invention.

The machine according to the present invention is characterized primarily in that at least one of the elastic bands, preferably the inner band, has been designed as inflatable body or has such inflatable body connected thereto. This inflatable band or body when in non-inflated condition may have, for instance, a flat rectangular cross-section but is adapted by introducing a pressure medium, for instance compressed air, to increase the volume of the band. In this connection, the band is so designed as to be adapted first to grasp from the inside first the fabric marginal portions resting on the band and then uniformly and crease-free to bring said marginal portions into engagement with the drum or the fabric layers on the drum.

For the sake of completeness, it may be mentioned that the general idea of deforming fabric layers or carcasses by inflatable bodies is known while such inflatable bodies are adapted to carry out a setting operation of the carcass fabric. These heretofore known inflatable bodies, however, form independent structural elements and are unable simultaneously to function as grippers.

Referring now to the drawings in detail, the machine portion shown therein comprises a hollow shaft 1 having mounted thereon a tire building drum 2 which, in this instance forms a high-shoulder drum, and serves for receiving the tire fabric 3, which latter will later on form the carcass for the completed tire.

The machine frame is indicated at 4 and has pivotally connected thereto by means of a bolt 7 two lever arms 5 and 6. These lever arms are movable by means, for instance hydraulically controlled cam members, rollers or the like, in such a way that they will be able to move together in the same direction or individually relative to each other in the direction of the double arrow 8.

While FIG. 1 shows only one pair of levers 5 and 6, it is to be understood that a number of such pairs of levers are provided which are uniformly distributed and arranged around the circumference of the drum 2. The levers of all pairs have their free ends interconnected through the intervention of elastic annular concentric bands. In each of said lever pairs, that band which is designated with the reference numeral 9 and preferably consists of rubber or similar material, connects those levers 5 which face the drum axis or the axis of hollow shaft 1. The other annular elastic band which interconnects the outwardly located lever 6 has been designated with the reference numeral 10.

The build-up of the tire carcasses is effected in the following manner. First, the fabric layer 3 is mounted on a drum 2 while the marginal portion of the fabric layer 3 occupies a position indicated by the dash-lines 11. In view of a corresponding movement of drum 2 with regard to the machine frame 4 and in view of a certain movement of levers 5 and 6, first the free marginal portion of the fabric layer 3 is grasped between the bands 9 and 10 and is then, by a movement of levers 5 and 6 in the drum toward hollow shaft 1, placed against the lateral surface of drum 2. After the beads 12 have been placed in position in conformity with FIG. 1, while the hollow laterally protruding marginal portion 3' is nearly parallel to the axis of drum 2, levers 5 and 6 are so actuated that they will move into the position shown in FIG. 1. In this position, the front edge 13 of elastic band 9 will be located below the beads 12, whereas lever 6 occupies such a position that the elastic band 10 is located along a diameter which is greater than the outer diameter of the drum.

As will be particularly evident from FIG. 5, the elastic band 9 has a double wall and is equpped with a connection 14 for connection with a compressed air supply. Part 15 located at the outer circumference of elastic band 9 has a thinner wall than part 16 located at the inner circumference. Part 16 is provided with a protrusion 17 which engages a recess or groove 18 in lever 5 for anchoring the elastic band 9 on the free end of lever 5. Parts 15 and 16 of band 9 are practically lying one upon the other when no pressure medium is conveyed to band 9 through connection 14. In this condition, as particularly shown in FIG. 5, band 9 will have a flat rectangular cross-section. It should furthermore be noted that the wall thickness of part 15 decreases toward the edge 13 for a purpose which will presently appear.

If, through connection 14 compressed air is introduced into the hollow chamber 18' of band 9, that portion of the fabric margin 3' which rests on part 15 will be gradually raised in conformity with the elastic deformation of part 15. The pressure within the hollow chamber 18' will now be increased to such an extent that in conformity with FIGS. 2 to 4, the marginal portion 3' of the fabric will be placed against that portion of the fabric layer 3 which is already on the drum. This placing will occur free from folds or creases. In order to assure that a relatively large deformation of band 9 will be possible and that the fabric margin 3' can be folded and set properly up to the range of the maximum diameter of drum 2, the elastic band 3 which embraces the levers 5 at a certain pre-tension will, particularly within the range behind the protrusion 17 simply rest on surface 19 of lever 5. Thus, as shown in FIG. 4, a lifting-off movement of the rear section 16' of band 19 will be possible.

After the placing operation has been completed in conformity with FIG. 4, the chamber 18' is relieved from the pressure medium so that this chamber will collapse and band 9 will, due to its elasticity, return into its normal position illustrated in FIGS. 1 and 5.

The design of the elastic bands according to the present invention has the further important advantage that by introducing a pressure medium into chamber 18', the setting pressure may be varied when the bands 9 and 10 occupy their gripping position, which means to grasp the marginal portion of fabric 3 therebetween. In this position of bands 9 and 10 also the irregularities in the gripper position may be compensated for, for instance when the grasping surfaces of bands 9 and 10 are not parallel to each other.

It is, of course, to be understood that the present invention is, by no means, limited to the particular construction shown in the drawings but also comprises any modifications within the scope of the appended claims.

It may also be mentioned that the placing of the fabric 3 upon the drum 2 resp. the radial movement of the grippers 5, 6 and the axial movement of the drum 2 toward the grippers 5, 6 is shown in FIGS. 1a–e. The general arrangement and details of the machine are subject of the co-pending application 771,433 filed November 3, 1958.

What we claim is:

1. A machine for making carcasses for pneumatic vehicle tires, which includes: a drum for receiving fabric layers to be formed into a carcass, and inner and outer annular gripper means arranged laterally of said drum and co-axial therewith and operable to grasp the marginal portion of fabric layers on said drum and to form the fabric layers about the adjacent lateral portion of said drum, at least one of said annular means including inflatable body means selectively inflatable for expanding said body means in conformity with the contour of the respective adjacent lateral portions of said drum following the forming of the fabric layers about the lateral portion of the drum thereby to form the said marginal portion of said fabric layer against the adjacent lateral portion of said drum, said body means being block-like in cross section and having a slit-like chamber therein for receiving pressure fluid to expand the body means.

2. A machine for making carcasses for pneumatic vehicle tires, which includes: a drum for receiving fabric layers to be formed into a carcass, and outer and inner annular means arranged substantially coaxially with regard to each other and with said drum and forming gripper means to grasp therebetween the marginal portion of fabric layers on said drum and to form the fabric layers about the adjacent lateral portion of said drum, at least said inner annular means comprising an inflatable belt block-like in cross section and having a slit-like chamber therein adapted to receive fluid pressure to inflate said belt for expanding said belt toward the drum in conformity with the contour of the respective adjacent lateral portion of said drum following the forming of the fabric layers about the lateral portion of the drum thereby to form the said marginal portion of said fabric layer against the adjacent lateral portion of said drum.

3. A machine for making carcasses for pneumatic vehicle tires, which includes: a drum for receiving fabric layers to be formed into a carcass, outer and inner annular means arranged substantially coaxially with regard to each other and with said drum and forming gripper means to grasp therebetween the marginal portion of fabric layers on said drum and to form the fabric layers about the adjacent lateral portion of said drum, at least said inner annular means comprising an inflatable belt block-like in cross section and having a slit-like chamber therein adapted to receive fluid pressure to inflate said belt for expanding said belt toward the drum in conformity with the contour of the respective adjacent lateral portion of said drum following the forming of the fabric layers about the lateral portion of the drum thereby to form the said marginal portion of said fabric layer against the adjacent lateral portion of said drum, said slit-like chamber being so disposed that the inwardly facing wall of said inflatable belt remote from said marginal portion of the fabric is thicker than the outwardly facing wall of said belt which engages said marginal portion of the fabric.

4. A machine for making carcasses for pneumatic vehicle tires, which includes: a drum for receiving fabric layers to be formed into a carcass, inner and outer annular belt means arranged substantially coaxially with regard to each other and with said drum and forming gripper means to grasp therebetween the marginal portion of fabric layers on said drum and to form the fabric layers about the adjacent lateral portion of said drum, said gripper means comprising a plurality of pairs of lever means, one lever means of each pair supporting said outer belt means on the outside thereof and the other lever means of the said pair supporting said inner belt means on the inside thereof, at least said inner belt means comprising an inflatable belt block-like in cross section and having a slit-like chamber therein adapted to receive fluid pressure to inflate said belt for expanding said belt toward the drum in conformity with the contour of the respective adjacent lateral portion of said drum following the forming of the fabric layers about the lateral portion of the drum thereby to form the said marginal portion of said fabric layer against the adjacent lateral portion of said drum.

5. A machine according to claim 4, in which that portion of the inflatable belt which is remote from said drum is adapted in response to a certain inflation of said belt to lift itself off from the supporting lever means therefor.

6. A machine for making carcasses for pneumatic vehicle tires, which includes: a drum for receiving fabric layers to be formed into a carcass, inner and outer annular belt means arranged substantially coaxially with regard to each other and with said drum and forming gripper means to grasp therebetween marginal portions of fabric layers on said drum and to place the same into engagement with lateral portions of said drum, said gripper means comprising a plurality of pairs of lever means, one lever means of each pair supporting said outer belt means on the outside thereof and the other lever means of the same pair supporting said inner belt means on the inside thereof, at least said inner belt means comprising an inflatable belt block-like in cross section and having a slit-like chamber therein adapted to receive fluid pressure to inflate said belt for expanding said belt toward the drum in conformity with the contour of the respective adjacent lateral portion of said drum following the forming of the fabric layers about the lateral portion of the drum thereby to form the said marginal portion of said fabric layer against the adjacent lateral portion of said drum, said inflatable belt and the respective supporting lever means therefor supporting having positively interengaging sections for retaining said belt and lever means in contact with each other while said belt is inflated.

7. A machine according to claim 3, in which the thickness of the outwardly facing wall decreases in the direction toward said drum.

8. A machine according to claim 4, which includes means operatively connected to the lever means for the inner belt means and operable selectively to adjust said inner belt means to various diameters.

References Cited by the Examiner
UNITED STATES PATENTS

| 2,951,526 | 9/60 | Haase | 156—401 |
| 3,081,814 | 3/63 | Beckadolph et al. | 156—400 |

FOREIGN PATENTS

| 232,492 | 8/59 | Australia. |

EARL M. BERGERT, *Primary Examiner.*